March 16, 1954  H. K. B. STEVEN  2,672,264
WATER BAG CARRIER FOR VEHICLES
Filed Sept. 21, 1950
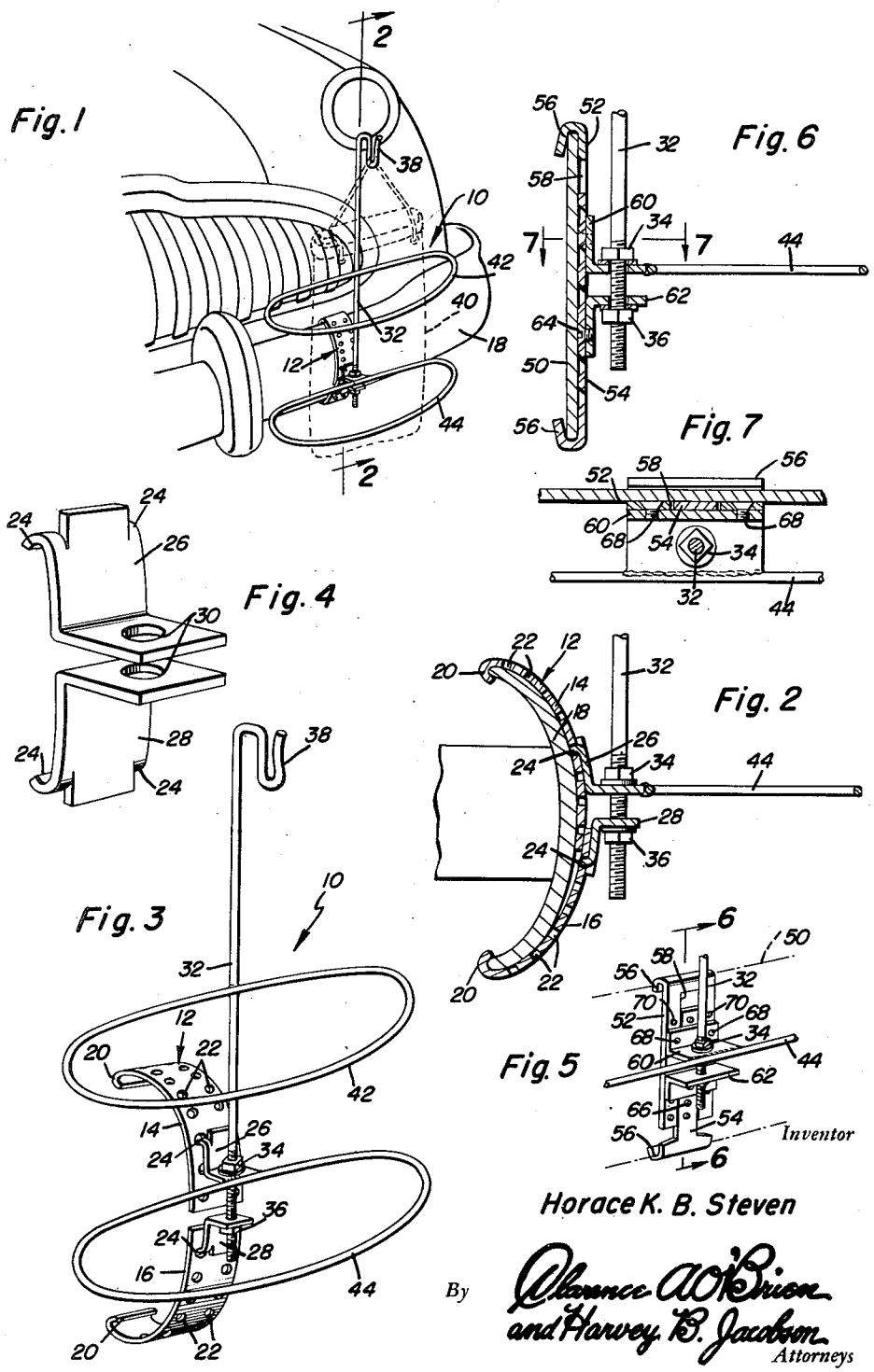
Inventor
Horace K. B. Steven Patented Mar. 16, 1954

2,672,264

UNITED STATES PATENT OFFICE 2,672,264

WATER BAG CARRIER FOR VEHICLES

Horace K. B. Steven, Culberson County, Tex.

Application September 21, 1950, Serial No. 185,998

1 Claim. (Cl. 224—42.03)

This invention relates to new and useful improvements and structural refinements in carriers for water bags, more particularly, water bags such as commonly employed for holding a supply of water while traveling through desert regions, and the principal object of the invention is to provide a carrier which may be attached to the front or rear bumper of a vehicle such as an automobile, so that a water bag suspended from the carrier may be exposed to a current of cool air while the vehicle is in motion.

An important feature of the invention resides in suspending the water bag from the carrier in such manner that it does not come in contact with the body of the vehicle, so that the vehicle is not scratched or otherwise damaged.

Some of the advantages of the invention lie in its simplicity of construction, in its efficient operation, and in its adaptability for use on vehicle bumpers of different sizes and types.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention applied to a vehicle bumper, the water bag being shown by dotted lines;

Figure 2 is a fragmentary vertical sectional view, taken substantially along the plane of the line 2—2 in Figure 1;

Figure 3 is a perspective view of the invention per se;

Figure 4 is a group perspective view of a pair of brackets used in the invention;

Figure 5 is a fragmentary perspective view of a modified embodiment of the invention;

Figure 6 is a vertical sectional detail, taken substantially on the plane of the line 6—6 in Figure 5; and, Figure 7 is a horizontal sectional detail, taken substantially on the plane of the line 7—7 of Figure 6.

Like characters of reference are employed to designate like parts in the specification and throughout the several views.

Referring now to the accompanying drawings in detail, more particularly to Figures 1-4 inclusive, the invention consists of a water bag carrier which is designated generally by the reference character 10 and embodies in its construction a clamp 12 including a pair of complemental, arcuate metallic straps or sections 14, 16 which are adapted to be positioned on the face of a vehicle bumper bar 18, as is best shown in Figures 1 and 2.

The clamp sections 14, 16 may be bent by hand to conform substantially to the transverse curvature of any bumper bar, and the outer ends of the clamp sections are preferably formed with hook-shaped extremities 20 to lockably engage the upper and lower longitudinal edges of the bumper bar, as shown.

The clamp sections 14, 16 are provided with several pairs of apertures 22 to selectively receive pairs of angulated detents 24 provided on a pair of angle brackets 26, 28. These two brackets are adapted to be mounted on the respective clamp sections 14, 16 and, as best shown in Figure 4, are provided with a pair of registering apertures 30 to receive a screw threaded lower end portion of a support rod 32. A pair of nuts 34, 36 are provided on the screw threaded lower end portion of the rod 32, above and below the respective brackets 26, 28 and it will be apparent from the foregoing that by simply turning the two nuts 34, 36, the brackets 26, 28 may be drawn together, thus also drawing together the clamp sections 14, 16 and firmly attaching the entire device to the bumper. While the brackets and clamp sections are drawn together, one clamp section may overlap the other as shown in Figure 2, and needless to say, by simply loosening the nuts 34, 36, the detents 24 of the brackets 26, 28 may be withdrawn from certain pairs of the apertures 22 and inserted in other pairs of apertures, whereby the clamps may readily accommodate bumper bars of different widths.

The upper end portion of the support rod 32 is formed so as to provide a hook 38 from which a conventional water bag 40 may be suspended as shown in Figure 1, and means are provided for sustaining the water bag against swinging or swaying while the vehicle is in motion, these means simply consisting of a pair of horizontally disposed, elongated loops or hoops 42, 44, the former being secured by welding to an intermediate portion of the rod 32 while the latter is similarly secured to the front edge of the bracket 26. In this manner the loops or hoops 42, 44 are vertically spaced and embrace the water bag in vertically spaced planes, thus preventing the latter from excessive swinging or swaying.

The modified embodiment of the invention which is illustrated in the accompanying Figures 5-7 inclusive is very similar to the embodiment already described, with the exception of the bumper bar engaging clamp. In the modified embodiment the clamp is intended to be placed on a bumper bar 50 and may be bent by hand to fit a flat bar or an arcuate bar, as necessary. This clamp consists of a pair of clamp sections 52, 54 provided at the free ends thereof with hook-shaped extremities or jams 56 to engage the upper and lower longitudinal edges of the bumper bar, as shown.

The main body portion of the clamp section 54 is in the form of a bar much narrower than the clamp section 52, and the latter, which comprises an elongated plate, is provided with a slot 58 which is open at the bottom and has the clamp section 54 slidable therein.

The support rod 32 is mounted in a pair of angle brackets 60, 62, the bracket 62 being adjustably secured by screw 64 to the clamp section 54 which is formed with a row of apertures 66 to selectively receive the screw 64, as shown. On the other hand, the bracket 60 is adjustably secured by a pair of screws 68 to the clamp section 52, the screws 68 being selectively receivable in pairs of apertures 70 provided in the clamp section 52 at the opposite sides of the slot 58.

It will be apparent from the foregoing that when the nuts on the support rod 32 are tightened, the brackets 60, 62 are drawn together, thus sliding the clamp section 54 upwardly in the slot 58 of the clamp section 52, and lockably engaging the hook-shaped extremities 56 of the two clamp sections with the upper and lower edges of the bumper bar 50, so as to securely retain the entire device in position thereon.

It is believed that the advantages and use of the invention will be clearly understood from the foregoing disclosure, and accordingly, further description thereof at this point is deemed unnecessary.

While in the foregoing there has been shown and described the preferred embodiment of the invention, it is to be understood that minor changes in the details of construction and arrangement of parts may be resorted to without departing from the spirit and scope of the invention as claimed.

Having described the invention, what is claimed as new is:

A water bag carrier for vehicle bumpers of arcuate transverse section comprising; a clamp including a pair of lapped, metallic relatively adjustable straps mounted vertically on the convex side of the bumper and substantially conforming to the cross-sectional shape thereof and having spaced series of apertures therein, hooks on the outer ends of said straps engaged with the longitudinal edges of the bumper, angle brackets comprising pairs of detents on one end portion engageable selectively in the apertures for adjustably and removably mounting said angle brackets on the straps, said angle brackets having vertically aligned openings in their other end portions, a vertical rod engaged in the openings, nuts threaded on the rod above and below the brackets and constituting common means for securing said rod thereon, for securing said brackets on the straps and for securing said straps on the bumper, a water bag suspension hook on the upper end of the rod, and vertically aligned retaining loops for the reception of the bag on the intermediate portion of the rod and on one of the brackets.

HORACE K. B. STEVEN.

References Cited in the file of this patent

UNITED STATES PATENTS

| Number | Name | Date |
| --- | --- | --- |
| 1,313,959 | Smith | Aug. 26, 1919 |
| 1,547,340 | Marshall | July 28, 1925 |
| 1,689,436 | Hodge | Oct. 30, 1928 |
| 2,142,365 | McKee | Jan. 3, 1939 |
| 2,379,994 | Schwinn | July 10, 1945 |
| 2,447,771 | Rogers | Aug. 24, 1948 |
| 2,521,221 | Ivey | Sept. 5, 1950 |
| 2,529,686 | Green | Nov. 14, 1950 |
| 2,561,199 | Harder | July 17, 1951 |